(12) United States Patent
Stuart

(10) Patent No.: US 6,837,204 B1
(45) Date of Patent: Jan. 4, 2005

(54) CONTINUOUSLY VARIABLE INTAKE MANIFOLD WITH AN ADJUSTABLE PLENUM

(75) Inventor: Philip Edward Arthur Stuart, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 31 days.

(21) Appl. No.: 10/601,978

(22) Filed: Jun. 23, 2003

(51) Int. Cl.[7] .............................................. F02M 35/10
(52) U.S. Cl. ................................................. 123/184.55
(58) Field of Search ................................... 123/184.55

(56) References Cited

U.S. PATENT DOCUMENTS

| | | | |
|---|---|---|---|
| 4,368,698 A | 1/1983 | Matsuo et al. | |
| 4,423,706 A | 1/1984 | Onodera | |
| 4,617,897 A | 10/1986 | Sasaki et al. | |
| 4,986,228 A | 1/1991 | Tharman | |
| 5,009,199 A | 4/1991 | MacFarlane | |
| 5,638,785 A | 6/1997 | Lee | |
| 5,653,202 A | 8/1997 | Ma | |
| 5,687,684 A | 11/1997 | Verkleeren | |
| 5,704,327 A | 1/1998 | Dohring | |
| 5,715,781 A | 2/1998 | Martinelli | |
| 5,890,464 A | 4/1999 | Martinelli | |
| 5,950,587 A | 9/1999 | Sattler et al. | |
| 6,161,513 A | 12/2000 | Lohr et al. | |
| 6,209,502 B1 | 4/2001 | Davis et al. | |
| 6,260,528 B1 | 7/2001 | Pringle et al. | |
| 6,302,076 B1 | 10/2001 | Bredy | |
| 6,308,686 B1 | 10/2001 | Mammarella et al. | |
| 6,314,949 B1 | 11/2001 | DeGrazia, Jr. et al. | |
| 6,460,501 B1 * | 10/2002 | Fischer et al. | 123/184.55 |

* cited by examiner

*Primary Examiner*—Noah P. Kamen

(57) ABSTRACT

An intake manifold includes a plenum volume 14 mounted for movement within a housing 20 in response to a drive system 22 to define an effective runner length. A multiple of deformable runner passages 18 include a flexible section 26 such that as the plenum 14 extends and retracts within the housing 20, the flexible section 26 accommodates the difference in length while the housing 20 provides structural support therefor. An intake conduit 12 likewise includes a flexible section 26 to accommodate movement of the plenum 14. In operation at low engine speeds, the plenum 14 is driven to extend the deformable runner passages 18 to increase the length between the plenum 14 and the engine cylinders 16. As the engine speed increases, the plenum 14 is driven to shorten the deformable runner 18 for maximum speed operation.

9 Claims, 4 Drawing Sheets

CONTINUOUSLY VARIABLE INTAKE MANIFOLD WITH AN ADJUSTABLE PLENUM

BACKGROUND OF THE INVENTION

The present invention relates to a vehicle intake manifold, and more particularly to an intake manifold having an adjustable plenum to provide variable runner length during engine operation.

An air intake manifold of a multi-cylinder engine is a branched pipe arrangement which connects the valve ports of each cylinder with an air inlet. The manifold may have considerable effect on engine performance. The intermittent or pulsating nature of the airflow through the manifold into each cylinder may develop resonances in the airflow at certain engine speeds. These may increase the volumetric efficiency and thus, the power at certain engine speeds, but may reduce such efficiency at other speeds, depending on manifold dimensions and shape.

Conventional intake manifolds for vehicles have a fixed air flow geometry. With a fixed intake system, the speed at which intake tuning occurs is also fixed. Since the engine operates over a broad RPM range, and since a different geometry may be ideal for different engine speeds, fixed geometry intake systems are designed with a geometry which is optimal for only a limited range of engine speeds. The intake is often designed as a compromise between torque at low speeds and horsepower at high speeds.

Various designs for variable intake geometry have met with varying degrees of success. Each of these conventional variable intake manifolds may be rather complex and expensive to produce. Servicing difficulty and limited variable tuning may also be disadvantageous design results of conventional variable intake manifolds.

Accordingly, it is desirable to provide a cost effective variable intake manifold which will operate with different types of engines and yet still maximize the variable tuning available during engine operation.

SUMMARY OF THE INVENTION

The intake manifold assembly according to the present invention includes a plenum volume mounted for movement within a housing. The plenum volume moves within the housing in response to a drive system to define an effective runner length. A multiple of deformable runner passages include a flexible section such that as the plenum extends and retracts within the housing, the flexible section accommodates the difference in length while the housing provides structural support therefor. An intake conduit likewise includes a flexible section to accommodate movement of the plenum volume.

Another intake manifold assembly provides a generally curved housing such that the plenum moves along an arcuate path. Another intake manifold assembly provides a plenum which receives the intake conduit at a central location rather than a plenum end.

In operation at low engine speeds, the plenum is driven to extend the deformable runner passages to increase the length between the plenum and the engine cylinders. As the engine speed increases, the plenum is driven to shorten the deformable runner for maximum speed operation. As the effective size of the plenum itself is maintained constant and is relatively small, a constant idle speed is provided as compared to systems which vary plenum volume.

The present invention therefore provides a cost effective variable intake manifold which will operate with different types of engines and yet still maximize the variable tuning available during engine operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
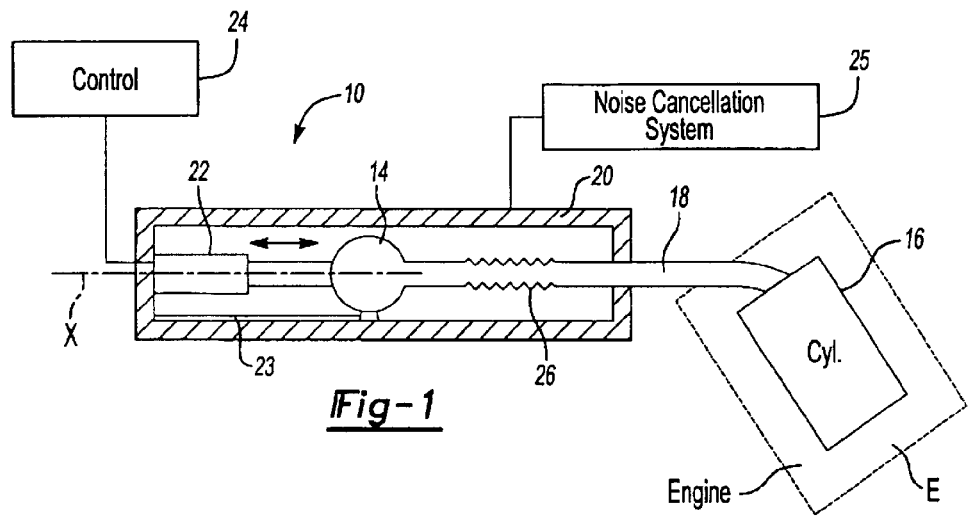
FIG. 1 is a side partially sectional view of an intake manifold assembly according to the present invention.

FIG. 1 illustrates a general schematic view of an intake manifold assembly 10 which communicates with an engine E. The assembly 10 generally includes an intake conduit 12 which communicates airflow to a movable plenum volume 14. As generally known, the plenum 14 receives intake airflow through the intake conduit 12 from a throttle assembly, vehicle intake, or the like. Airflow from the plenum 14 is distributed to each of a multiple of engine cylinders (illustrated schematically at 16) through a respective deformable runner passage 18. That is, each cylinder 16 preferably receives airflow from the plenum 14 through a respective runner 18.

The assembly 10 may include the single manifold assembly 10 supplying intake air to all cylinders as illustrated or may include multiple manifold assemblies which will also benefit from the present invention. It should be further understood that the respective deformable runner passages 18 may communicate directly with the engine cylinders 16 or may first communicate with an adapter which mounts the assembly 10 to a particular engine such that any engine may be retrofit with the intake manifold assembly 10 of the present invention.

The plenum volume 14 is mounted within a housing 20 for movement along an axis X therein. The plenum volume 14 retracts and extends within the housing 20 in response to a drive system 22. Preferably, the drive system 22 extends and retracts the plenum volume 14 along axis X to define a linear distance L thereby defining an effective runner length. An anti-rotation member 23 such as a key and slot arrangement preferably assures that the plenum 14 moves smoothly within the housing 20 and does not rotate therein.

The drive system 22 communicates with a controller 24 to selectively move the plenum 14 and change the length of the respective deformable runner passages 18 to thereby provide a continuously variable intake manifold assembly 10. It should be understood that the controller 24 may be integrated with the drive system 24 or be remotely located.

Each respective deformable runner passage 18 includes a flexible section 26 such that as the plenum 14 extends and retracts within the housing 20, the flexible section 26 accommodates the difference in length while the housing 20 provides structural support therefor. That is, the displacement of the plenum 14 relative the fixed engine cylinder 16 is accommodated by the flexible section 26. The flexible section 26 is preferably a bellows section, a resilient section, a telescopic section or the like. The intake conduit 12 likewise includes a flexible section 26 (FIG. 2) to accommodate movement of the plenum 14.

Figure 2:
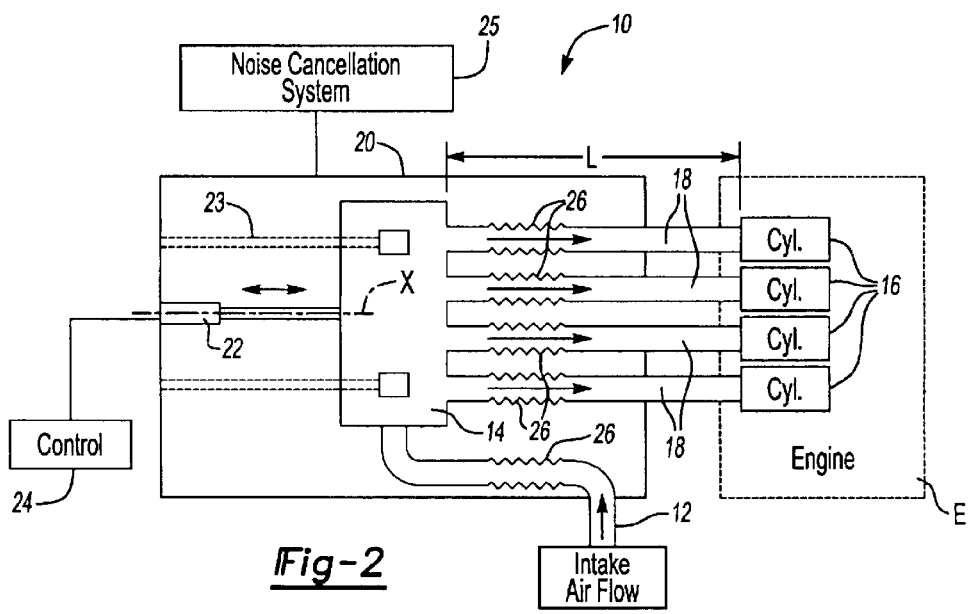
FIG. 2 is a top partial sectional view of an intake manifold assembly in accordance with the present invention.

Referring to FIG. 2, various drive systems 22 such as linear actuators, gear systems, electrical motors, or the like will benefit from the present invention. As the housing 20 contains the movable plenum 14, the deformable runner passages 18 and the intake conduit 12, a relatively flat rectangular assembly 10 is provided which is readily adapted to minimal packaging space constraints.

The housing 20 is a generally closed structure such that any leakage from the movable plenum 14, the deformable runner passages 18 or the intake conduit 12 is contained therein. Moreover, as the housing 20 is a generally closed structure the housing 20 may alternatively or additionally be utilized as a resonance chamber for a noise cancellation system (illustrated schematically at 25) as generally known.

Figure 3:
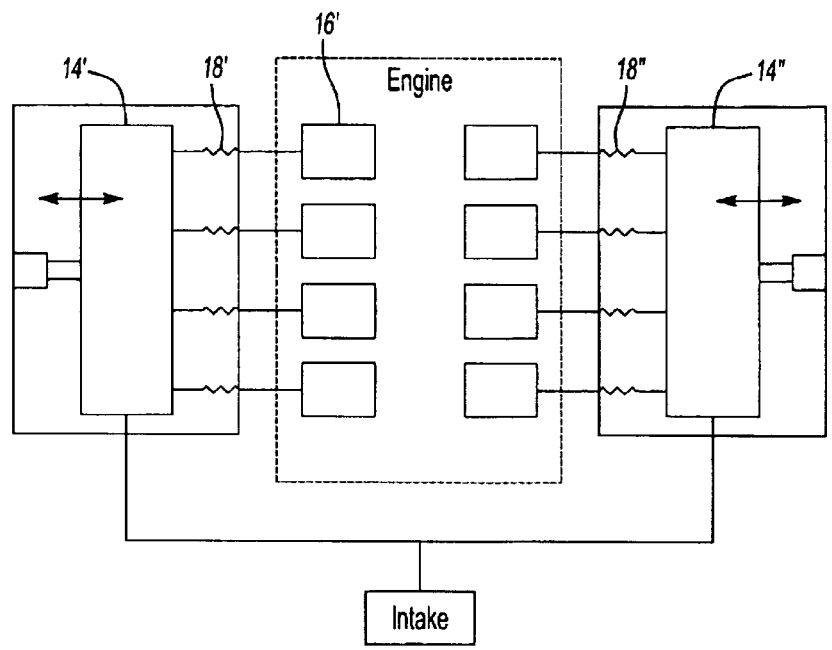
FIG. 3 is a top partially sectional view of an intake manifold assembly communication with two banks of engine cylinders.

Although the plurality of deformable runner passages 18 are preferably moved in concert with a single plenum 14, a multiple of plenums and drive systems will likewise benefit from the present invention such that one or more deformable runner passages 18 are individually adjustable in length. That is, a first plenum 14' is dedicated to one bank of cylinders 16' while a second plenum 14" is dedicated to a second bank of cylinders 16" (FIG. 3).

Figure 4:
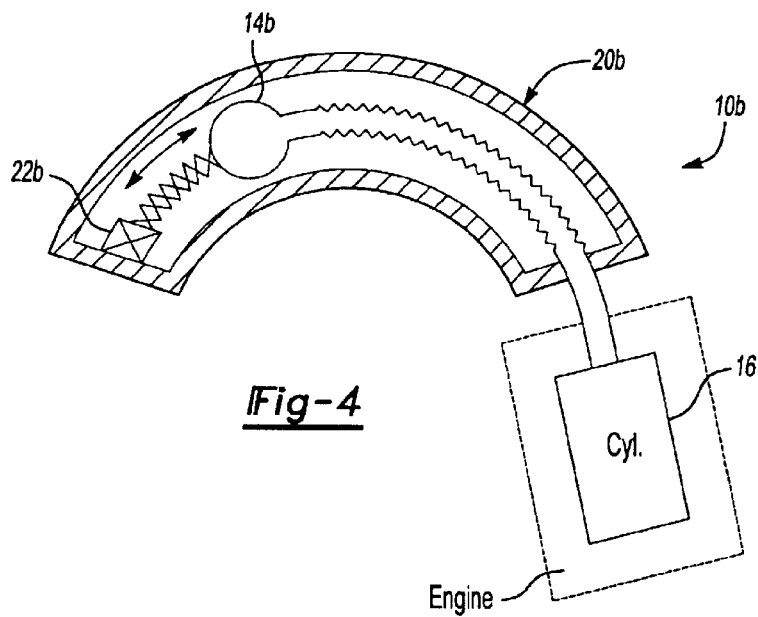
FIG. 4 is a side partially sectional view of another intake manifold assembly according to the present invention.

Referring to FIG. 4, another intake manifold assembly 10b provides a generally curved housing 20b. The curved housing 20b guides the plenum 14b in an arcuate path therein but otherwise operates as described above.

Figure 5:
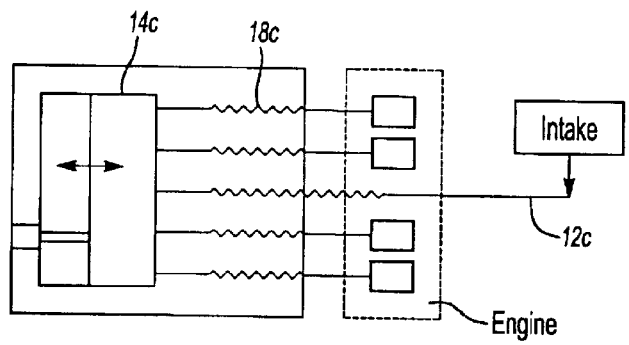
FIG. 5 is a top partially sectional view of another intake manifold assembly according to the present invention.

Referring to FIG. 5, another intake manifold assembly 10c provides a plenum 14c which receives the intake conduit 12c at a central location. That is, the intake conduit 14c is received between the runners 18c rather than a plenum end.

Figure 6:
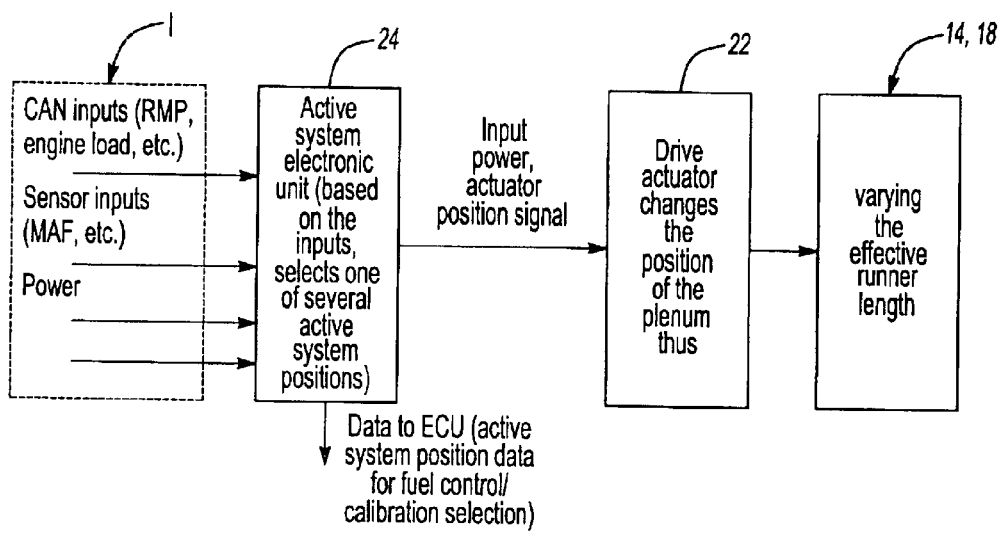
FIG. 6 is a block diagram of the methodology employed by the controller to generate an effective length of a runner manifold of the intake manifold assembly.

FIG. 6 depicts an operational methodology that operates the controller 22. Generally, inputs I are communicated to the controller 24 which communicates with the drive system 22 to move the plenum 14 within linear distance L to vary the effective length of the deformable runner passages 18.

Figure 7:
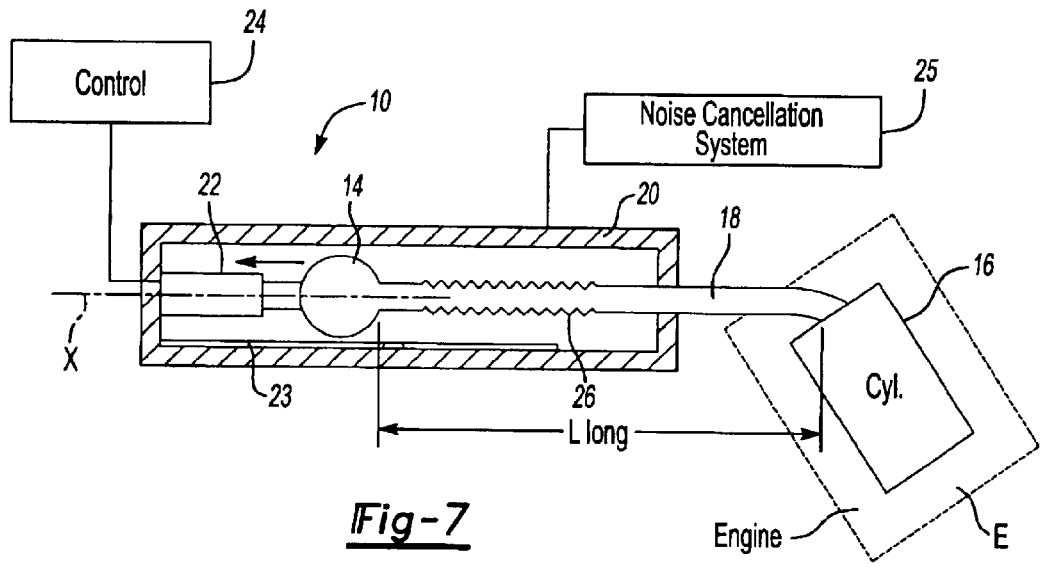
FIG. 7 is a side partially sectional view of the intake manifold assembly in a second position.
Figure 8:
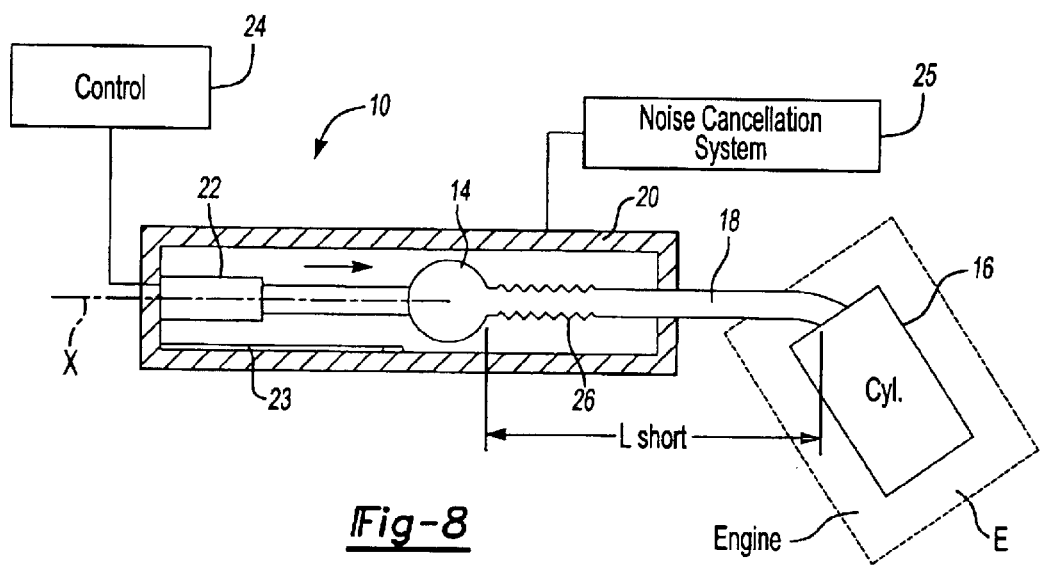
FIG. 8 is a side partially sectional view of the intake manifold assembly.

In operation at low engine speeds, the plenum 14 is driven to extend the deformable runner passages 18 to increase the length between the plenum 14 and the cylinders 16 which is the preferred tuning for the low engine speeds (FIG. 7). As the engine speed increases, the plenum 14 is driven to shorten the deformable runner passages 18 such that a relatively shorter length between the plenum 14 and the cylinders 16 for maximum speed operation is provided (FIG. 8). As the effective size of the plenum 14 itself is maintained constant and is relatively small, a constant idle speed is provided as compared to systems which vary plenum volume.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of the invention. It is, therefore, to be understood that within the scope of the appended claims, the invention may be practiced otherwise than as specifically described. For that reason the following claims should be studied to determine the true scope and content of this invention.

What is claimed is:

1. A vehicle intake manifold assembly comprising:
   a housing;
   a plenum movable within said housing;
   a deformable runner passage which communicates between said plenum and an engine cylinder, said deformable runner passage deformable to define an effective runner length; and
   a drive system to selectively move said plenum within said housing to deform said deformable runner passage and vary said effective runner length.

2. The vehicle intake manifold assembly as recited in claim 1, wherein said deformable runner passages comprises a tubular member.

3. The vehicle intake manifold assembly as recited in claim 1, wherein said deformable runner passages comprises a flexible section.

4. The vehicle intake manifold assembly as recited in claim 1, wherein said housing supports said plenum for movement along an axis.

5. The vehicle intake manifold assembly as recited in claim 1, wherein said housing supports said plenum for movement along a curved path.

6. The vehicle intake manifold assembly as recited in claim 1, wherein said housing provides a resonance chamber for an active noise cancellation system.

7. A method of adjusting an effective runner length of a continuously variable vehicle intake manifold assembly comprising the steps of:
   (1) selectively moving a plenum within a housing to deform a deformable runner passage and adjust an effective runner length between the plenum and an engine cylinder.

8. A method as recited in claim 7, further comprising the step of:
   moving the plenum along an arcuate path.

9. A method as recited in claim 7, further comprising the step of:
   moving the plenum along a linear path.

* * * * *